United States Patent
Golway et al.

(10) Patent No.: US 11,650,960 B2
(45) Date of Patent: May 16, 2023

(54) DISTRIBUTED LEDGER TECHNOLOGY PLATFORM

(71) Applicant: Hewlett Packard Enterprise Development LP, Houston, TX (US)

(72) Inventors: Thomas Golway, Plandome, NY (US); Prabhanjan Gururaj, Bangalore Karnataka (IN); Gururaja Grandhi, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 35 days.

(21) Appl. No.: 17/012,641

(22) Filed: Sep. 4, 2020

(65) Prior Publication Data

US 2022/0075759 A1    Mar. 10, 2022

(51) Int. Cl.
 G06F 16/182    (2019.01)
 G06F 16/16     (2019.01)
 G06F 16/27     (2019.01)

(52) U.S. Cl.
 CPC .......... G06F 16/182 (2019.01); G06F 16/164 (2019.01); G06F 16/27 (2019.01); G06F 16/273 (2019.01); G06F 16/275 (2019.01); G06F 16/278 (2019.01)

(58) Field of Classification Search
 CPC ...... G06F 16/182; G06F 16/27; G06F 16/164; G06F 16/273; G06F 16/275; G06F 16/278
 See application file for complete search history.

(56) References Cited

U.S. PATENT DOCUMENTS

| | | | |
|---|---|---|---|
| 6,536,037 B1 * | 3/2003 | Guheen | G06F 8/71 703/2 |
| 9,235,442 B2 | 1/2016 | Kampas et al. | |
| 9,473,374 B2 | 10/2016 | Beaty et al. | |
| 2004/0139018 A1 * | 7/2004 | Anderson | G06Q 20/105 705/41 |
| 2018/0025166 A1 | 1/2018 | Daniel et al. | |
| 2018/0089644 A1 | 3/2018 | Chen et al. | |
| 2019/0034920 A1 * | 1/2019 | Nolan | H04L 9/0894 |
| 2019/0036778 A1 * | 1/2019 | Bathen | G06F 16/27 |
| 2019/0058709 A1 | 2/2019 | Kempf et al. | |
| 2019/0132350 A1 * | 5/2019 | Smith | G06F 16/2379 |

OTHER PUBLICATIONS

Bowen Xiao et al., "Edgetoll: a Blockchain-based Toll Collection System for Public Sharing of Heterogeneous Edges," Dec. 29, 2019, pp. 1-7.

(Continued)

*Primary Examiner* — Kris E Mackes
*Assistant Examiner* — Lin Lin M Htay
(74) *Attorney, Agent, or Firm* — Trop, Pruner & Hu, P.C.

(57) ABSTRACT

A distributed ledger system is described. The system includes a provider to provide a plurality of infrastructure resources, a client to access a first set of the plurality of resources; and an operator platform to facilitate access to the first set of resources from the providers, including a processor to generate one or more blocks of transaction data associated with each resource in the first set of resources to update chain code and measure of usage the first set of resources measure, wherein the chain code is stored in a distributed ledger database shared between the operator platform and the client.

24 Claims, 7 Drawing Sheets

(56) References Cited

OTHER PUBLICATIONS

Don Sheppard, "Blockchain for the Data Centre—Value Add or Just More Hype?," May 23, 2018, pp. 1-3, Retrieved from the Internet on May 22, 2020 at URL: <insightaas.com/blockchain-for-the-data-centre-value-add-or-just-more-hype/>.

Kyra Senese, "Blockchain Can Pay Off for XaaS Businesses and Others That Don't Dismiss It, Study Says," Nov. 26, 2018, pp. 1-3, Retrieved from the Internet on May 22, 2020 at URL: <spendmatters.com/2018/11/26/blockchain-can-pay-off-for-xaas-businesses/>.

* cited by examiner

DISTRIBUTED LEDGER TECHNOLOGY PLATFORM

BACKGROUND

Distributed ledger technology (DLT) is a digital system for recording the transaction of assets in which the transactions and their details are recorded in multiple places at the same time. Unlike traditional databases, distributed ledgers have no central data store or administration functionality. In a distributed ledger, each node processes and verifies every item, thereby generating a record of each item and creating a consensus on each item's veracity. A distributed ledger can be used to record static data, such as a registry, and dynamic data (e.g., transactions).

Delivering information technology "as-a-Service" is a way to deliver information technology resources using an on-demand model with the corresponding financial model where all information technology resources have variable pricing models based on resource consumption. Information technology resources include: hardware resources (e.g., compute, storage, network elements, etc.), software resources or microservices.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
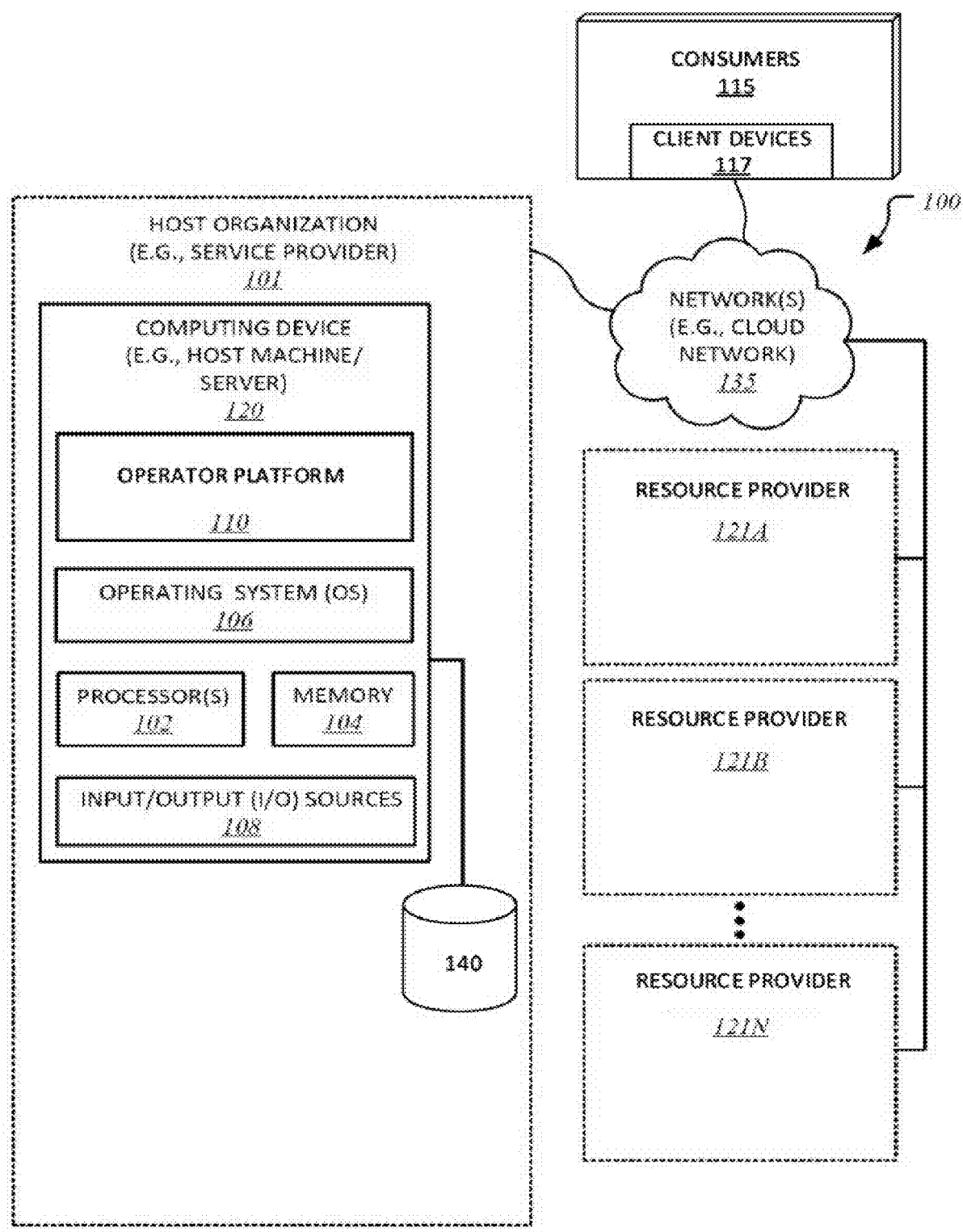
FIG. 1 illustrates one example embodiment of a distributed ledger system.

A hybrid cloud may include a public and/or private cloud environment at which Infrastructure-as-a-Service (IaaS) or Platform-as-a-Service (PaaS) is offered by a cloud service provider. The services of the public cloud may be used to deploy applications. In other examples, a hybrid cloud may also offer Software-as-a-Service (SaaS), such as in examples where the public cloud offers the SaaS as a utility (e.g. according to a subscription or pay as you go model). Hybrid clouds may implement virtualization technology to deploy virtual resources based on native hardware. Virtualization technology has typically been employed via virtual machine (VMs), with each application VM having a separate set of operating system, networking and storage. A hybrid cloud architecture with orchestration of workloads between private and public clouds provides the ability to manage infrastructure resources more effectively. However, a shortcoming in the implementation of hybrid cloud platforms is the challenge of adequately tracking resource consumption and accurately invoicing customers.

According to one embodiment, a Distributed Ledger Technology (DLT) platform is implemented to provide for service transactions for the use of asset resources (or resources). In such an embodiment, the DLT platform enables usage based tracking and invoicing for resources consumed by a resource consumer (or consumer). Thus, resources are available for use by consumers on a per unit of consumed resource basis, with a cost based on a resource type and associated service levels required by a consumer. In a further embodiment, payment for the services is provided via a cryptocurrency (e.g., crypto tokens). As used herein, cryptocurrency is defined as a digital asset designed to work as a medium of exchange wherein individual coin ownership records are stored in a digital ledger (e.g., a database) using cryptography to secure transaction record entries to control the creation of additional digital coin records and verify the transfer of coin ownership.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of a distributed ledger system 100 having a computing device 120 employing a distributed ledger operator platform (or operator platform) 110. In one embodiment, operator platform 110 operates as a distributed ledger infrastructure to facilitate access to resources from one or more resource providers 121 to consumers 115. As shown in FIG. 1, computing device 120 includes a host server computer serving as a host machine for employing operator platform 110, which provides a platform to facilitate management of resources on behalf of consumers (or clients) 115 via a PaaS or IaaS. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 117, etc. Computing device 120 further includes processor(s) 102, memory 104, input/output ("I/O") sources 108, such as touchscreens, touch panels, touch pads, virtual or regular keyboards, virtual or regular mice, etc. In one embodiment, operator platform 110 may be executed by a separate processor application specific integrated circuit (ASIC) than processor 102. In a further embodiment, operator platform 110 may act out of band, and may be on a separate power rail, from processor 102. Thus, operator platform 110 may operate on occasions in which processor 102 is powered down.

In one embodiment, host organization 101 may further employ a production environment that is communicably interfaced with client devices 117 at consumers 115 through host organization 101. Client devices 117 may include (without limitation) consumer-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of consumer 115. In some embodiments, host organization 101 receives input and other requests from a plurality of consumers 115 over one or more networks 135; for example, incoming data, or other inputs may be received from consumer 115 to be processed using database 140.

In one embodiment, each consumer 115 may be separate and distinct remote organizations, an organizational group within host organization 101, a business partner of host organization 101, a consumer 115 that subscribes to cloud computing services provided by host organization 101. In one embodiment, requests are received at, or submitted to, a web server within host organization 101. Host organization 101 may receive a variety of requests for processing by host organization 101. For example, incoming requests received at the web server may specify services of host organization 101 are to be provided. Further, host organization 101 may implement a request interface via the web server or as a stand-alone interface to receive requests packets or other requests from the client devices 117. The request interface may further support the return of response packets or other replies and responses in an outgoing direction from host organization 101 to one or more client devices 117.

In one embodiment, computing device 120 may include a server computer that may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 117, over one or more networks, such as network(s) 135.

In one embodiment, computing device 120 may serve as a service provider core for hosting an operator platform 110 as a SaaS or IaaS, and be in communication with one or more client computers 117, over one or more network(s) 135, and any number and type of dedicated nodes. In such an embodiment, host organization 101 provides infrastructure management to resources provided by resource providers 121A-121N (also referred to generally as providers 121 or a provider 121). Resource providers 121A-121N represent separate resource providers that offer services to provide infrastructure resources, including e.g.: hardware resources (e.g., compute, storage, network elements, etc.), software resources or microservices. As defined herein, microservices may relate to an architecture that structures a software application as a collection of services.

In such an embodiment, one or more of providers 121A-121N may provide a virtualization of its resources as a virtualization infrastructure for virtualization of its resources. In this embodiment, computing device 120 resources and/or one or more of the physical infrastructure resources provided by providers 121A-121N may be configured as one or more Point of Developments (PODs) (or instance machines), where an instance machine (or instance) comprises a cluster of infrastructure (e.g., compute, storage, software, networking equipment, etc.) that operate collectively.

According to one embodiment, each of the providers 121A-121N may implement an on-premise infrastructure controller to control its respective resources. In this embodiment, each provider 121 represents an on-premise infrastructure system (e.g., data center) that provides one or more infrastructure elements (e.g., an instance of managed infrastructure) of its respective resources. In other embodiments, resources may include service (or utility) commodities, such as gas electric, water, etc. In such embodiments, providers 121 provides resources to consumers 115 via operator platform 110.

As described above, operator platform 110 may be implemented in a distributed ledger infrastructure to facilitate access to resources. In one embodiment, the distributed ledger infrastructure provides a distributed ledger peer-to-peer network system that distributes a ledger across several peer nodes, where each node replicates and saves an identical copy of the ledger and updates itself independently. When a ledger update occurs, each node constructs a new transaction and a designated set of nodes subsequently vote using a consensus algorithm to determine which copy of the ledger is correct. Thus, the designated set of nodes authenticate and validate the correctness of a transaction for resources.

Figure 2A:
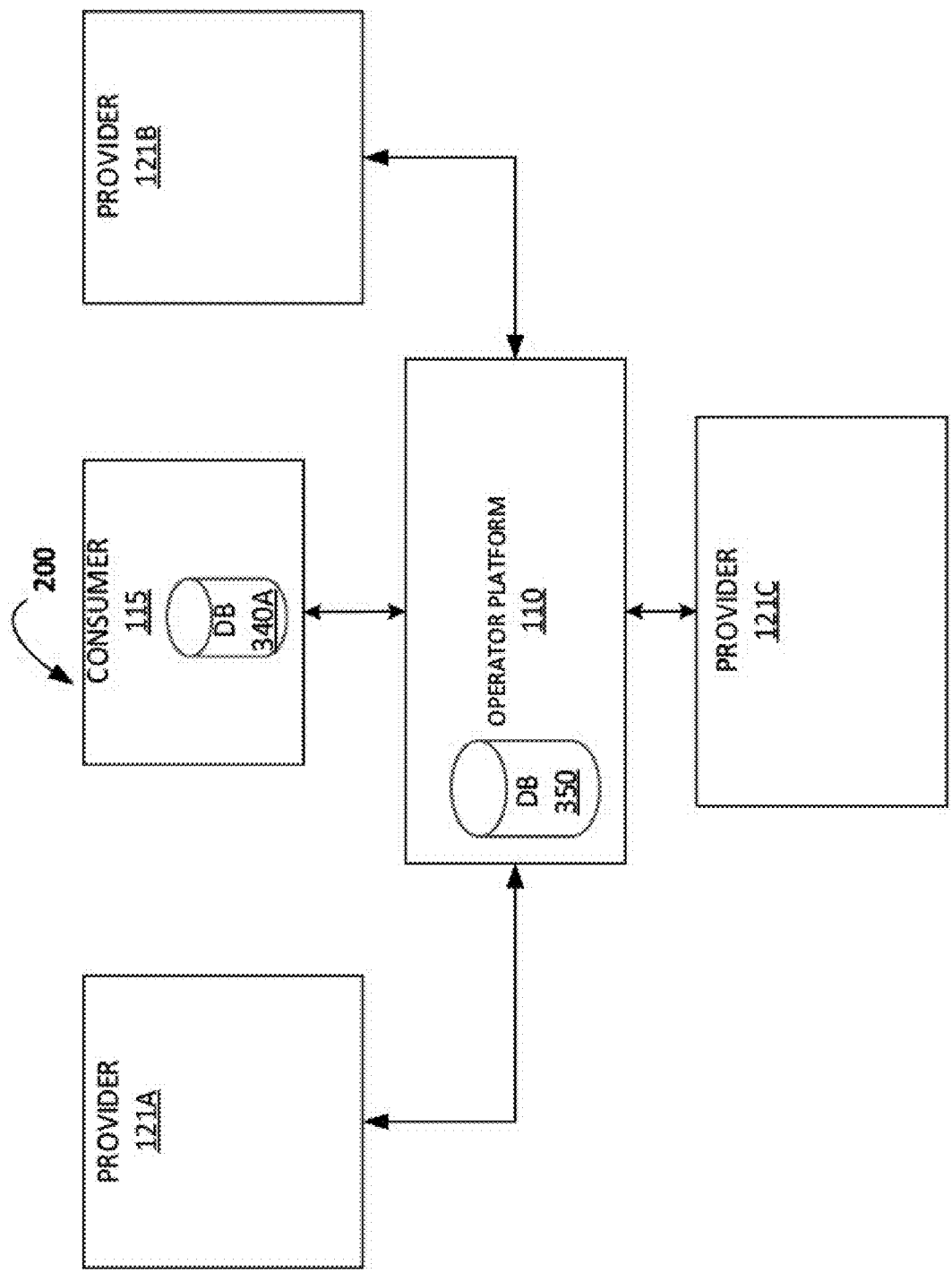
FIGS. 2A&2B illustrate example embodiments of a distributed ledger platform.
Figure 2B:
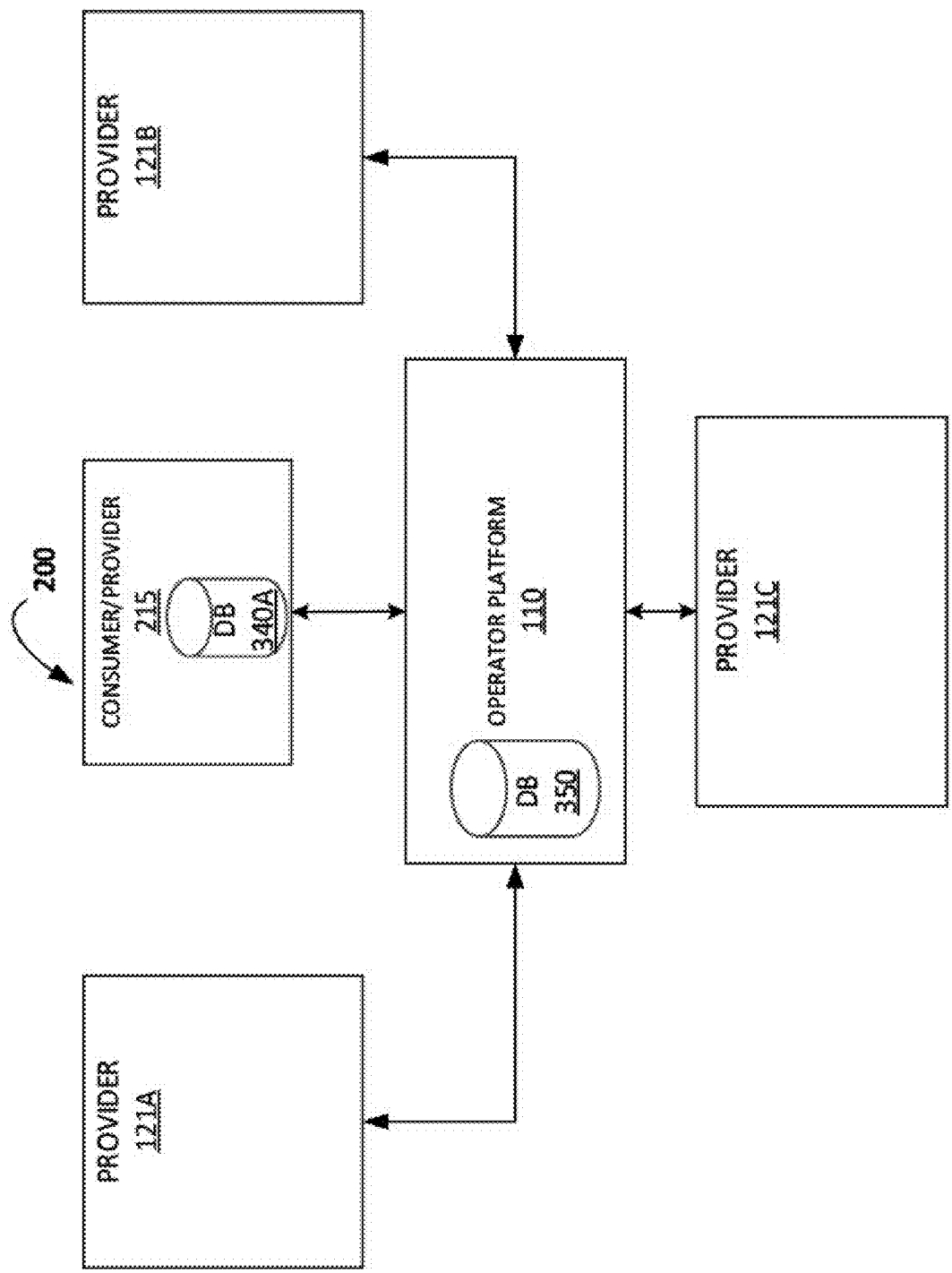

FIGS. 2A & 2B illustrate embodiments of a distributed ledger management system 200. FIG. 2A illustrates an embodiment in which a consumer 115 is coupled to operator platform 110 (e.g., via a network). According to one embodiment, operator platform 110 provides resources to consumer 115. In such an embodiment, the consumer 115 does not invest in (e.g., own) the resources, but instead receives the resources via operator platform 110. In a further embodiment, operator platform 110 may own the resources provided to consumer 115 or manage resources provided by one or more of providers 121A-121C. In an embodiment, one or more of providers 121A-121C may comprise public cloud providers or may be coupled to operator platform 110 via a dedicated network connection. In an embodiment, one or more of the providers 121A-121C may include infrastructure owned by an infrastructure vendor and made available on a pay-per-use basis or the like.

In one embodiment, operator platform 110 manages the billing for resource usage via DLT. In such an embodiment, operator platform 110 implements a DLT to store transaction data that is used to track details of resources utilized by a consumer 115. As discussed above, resources may comprise software (e.g., operating system, database, clustering software, etc.), infrastructure (e.g., hardware), or commodity services provided by providers 121 via operator platform 110. In a further embodiment, each resource consumed is an independent unit that is offered by operator platform 110 as a pay-per-use model. In such an embodiment, usage of each independent resource is measured and a block of chain code is generated to tokenize a consumed resource.

According to one embodiment, a smart contract (interchangeably referred to as "chain code") is maintained as an agreement between operator platform 110 and a consumer client. In a further embodiment, the smart contract is updated using blocks of transaction data, with each block being associated with an infrastructure resource consumed by a client. Accordingly, a separate smart contract is generated for resources consumed by each consumer (e.g., consumer 115) and stored in a distributed ledger associated with a corresponding consumer. In one embodiment, instances of a distributed ledger are stored at a database 250 at operator platform 110 and a database 240 at the consumer 115. Thus, the distributed ledger is shared between database 250, which stores a component of distributed ledgers for platform 110, and database 240, which stores the component of the distributed ledgers at consumer 115.

FIG. 2B illustrates an embodiment of system 200 in which a consumer 215 is coupled operator platform 110. In this embodiment, consumer 215 may be a consumer or a provider. For example, consumer 215 may consume utility resources managed by operator platform 110, while also maintaining its own energy source (e.g., solar panel). Thus, consumer 215 may provide any additional electricity provided by its energy source for consumption by another consumer. According to one embodiment, operator platform 110 may also manage any resources by consumer 215. In such an embodiment, consumer to consumer transactions are also managed via smart contracts.

In either of the embodiments discussed above, transaction data and an agreement between the parties are visible to the participants involved in the transaction via a distributed ledger. For example, any transaction between operator platform 110 and a consumer (e.g., 115 or 215) is visible only to those entities (e.g., peers) via database 250 and database 240, respectively. According to one embodiment, the smart contract is invoked prior to the facilitation of resource consumption by operator platform 110 and stored in the DLT. A smart contract is a machine executable program (or executable code) that is executed during a transaction. As mentioned above, a smart contract provides a legal agreement between parties (e.g., operator platform and consumer), and is automatically executed on the DLT based on agreed upon triggers. In such an embodiment, a smart contract is defined with a pricing per unit of each of the consumed resources. In further embodiments, the pricing terms may change over a period of time and a new smart contract will be deployed replacing a previous smart contract.

Figure 3:
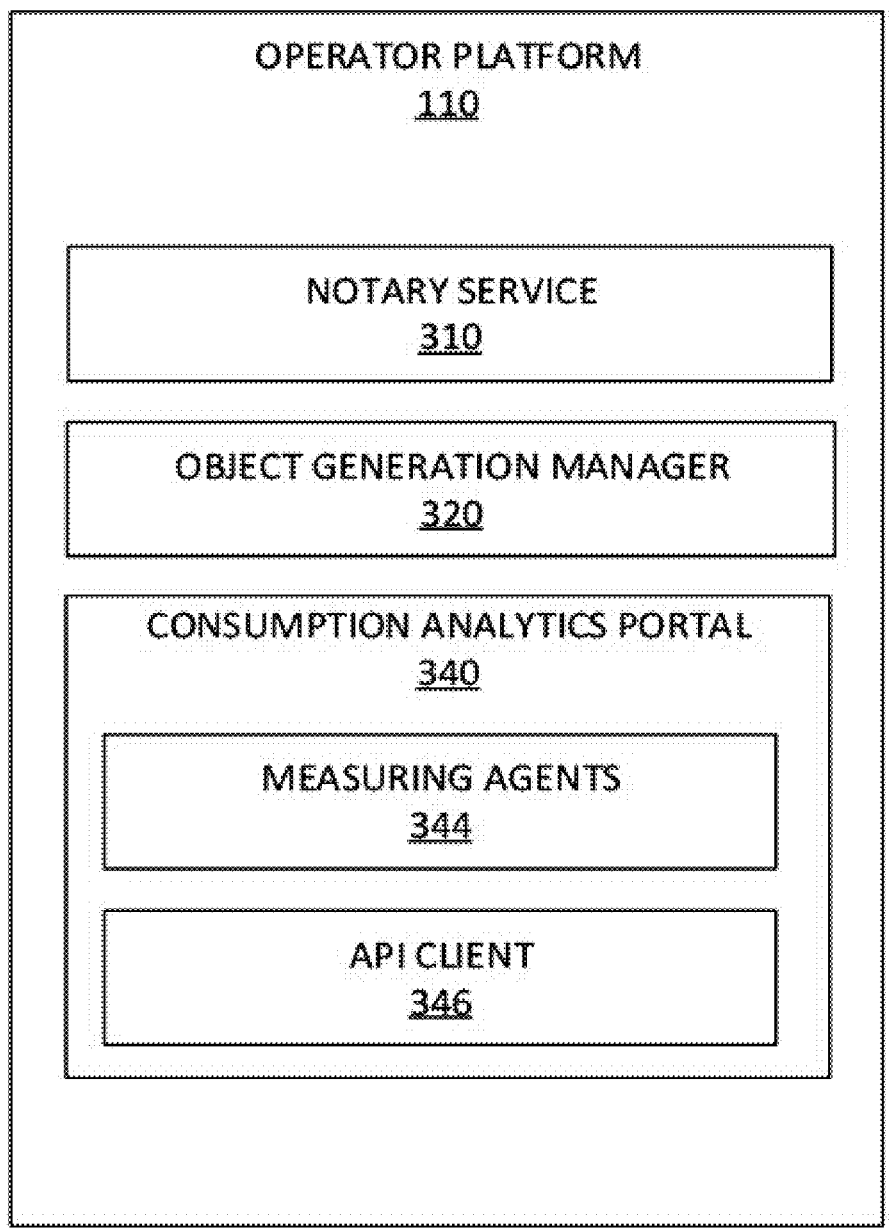
FIG. 3 illustrates one example embodiment of an operator platform.

FIG. 3 illustrates one embodiment of an operator platform 110. As shown in FIG. 3, operator platform 110 includes a notary service 310, object generation manager 320, and a consumption analytics portal 340. Notary service 310 is provided for record keeping and auditing of smart contracts stored in a DLT. However in other embodiments, notary service 310 may be hosted at a third party (not shown) for further trust establishment. Object generation manager 320 is implemented to generate blocks of transaction data to be included in the chain code.

In one embodiment, transaction data in a block includes a resource object and a token object. In such an embodiment, a resource object includes metadata and an identity of a resource requested by the consumer, while a token object defines specifics regarding monetization of the resource. In a further embodiment, object generation manager 320 identifies resources being used by a consumer and generates a resource object for each resource that is billable (billable resource) to a consumer. Subsequently, object generation manager 320 tokenizes the resources by generating a token object associated with a resource object.

According to one embodiment, the token object comprises a digital representation of an asset that includes an identifier, type of asset, and one or more consumption metrics. In such an embodiment, the consumption metrics are unique to the type of asset. For example, a CPU core consumption metric may include utilization and time, while a memory consumption metric may include an amount of memory and time. Thus, time may be the primary consumption metric dimension. However, an exception may be a microservice, where cost would be the result produced by the microservice. As shown above, a token object enables an operator and consumer to have a consistent normalized unit of consumption used for measuring, billing, and adjustments in which an operator or provider fails to achieve contracted service levels.

A consumption analytics portal 340 is implemented to measure the usage of a resource associated with a resource object. In one embodiment, consumption analytics portal 340 includes measuring agents 344 implemented to measure resource utilization. In such an embodiment, each measuring agent 344 comprises a microservice that periodically measures the utilization of an associated resource. In further embodiments, the microservice measures the utilization of a resource by initiating communication with a resource specified in a resource object and retrieving utilization data. Table 1 illustrates examples of resource utilization measuring microservices.

TABLE 1

| Microservice | Details |
| --- | --- |
| MS_CPU_UTLILIZATION | Microservice to measure a CPU utilization of a given resource. |
| MS_MEM_UTILIZATION | Microservice to measure a memory utilization of a given resource. |
| MS_STORAGE_UTILIZATION | Microservice to measure a storage space utilization of a given resource. |
| MS_NET_UTILIZATION | Microservice to measure a network bandwidth utilization of a given resource. |
| MS_SOFTWARE_UTILIZATION | Microservice to measure a software usage of a given resource. |
| MS_SERVICE_UTILIZATION | Microservice to measure a service usage of a given resource. |
| MS_CUSTOM_PARAMETER_UTILIZATION | Microservice to measure a custom parameter utilization of a given resource. |

Figure 4:
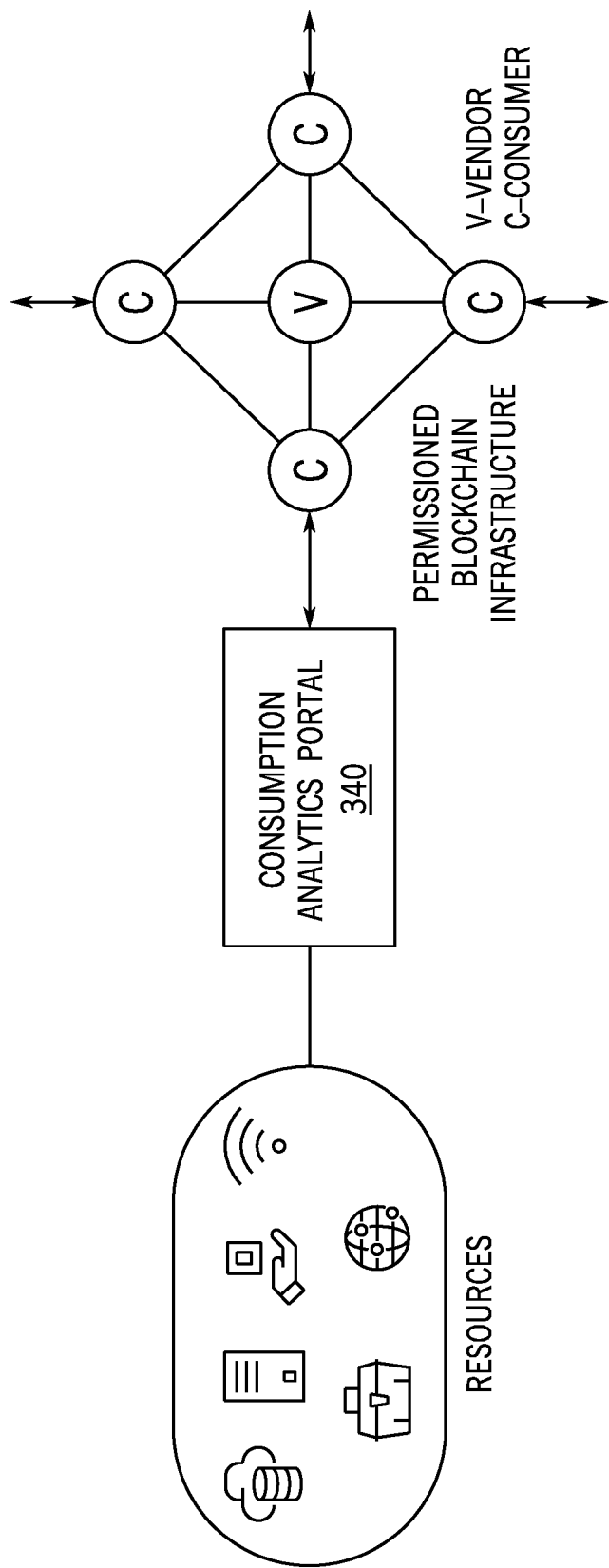
FIG. 4 illustrates one example embodiment of a resource utilization diagram.

In one embodiment, a measuring agent 344 retrieves utilization data from a resource specified in a resource object. In such an embodiment, each of the microservices connects securely to an associated resource and retrieves the utilization data. For example, the microservice that is associated with the utilization of the compute node (MS_CPU_UTLILIZATION) logs into a compute node as specified in the resource object, and retrieves the CPU utilization data. Similarly the microservice that is associated with the utilization of the memory of a node (MS_MEM_UTILIZATION) retrieves the memory consumption data. In one embodiment, the measured resource data is included in the transaction data as units of consumption data. FIG. 4 illustrates one embodiment of a resource utilization diagram in which consumption analytics portal 340 generates transaction data based on measured resource usage and transmits the data to a DLT.

Consumption analytics portal 340 also includes an application program interface (API) client 346 that is invoked by a measuring agent 344 to transmit the transaction data to the DLT to update the smart contract. API client 346 may also be implemented to query the state of database 250. In one embodiment, the transaction data is verified and signed by the consumer 115, the resource provider 121, and operator platform 110 prior to updating the smart contract stored in the DLT with updated consumption and/or pricing details included in the transaction data blocks.

Figure 5:
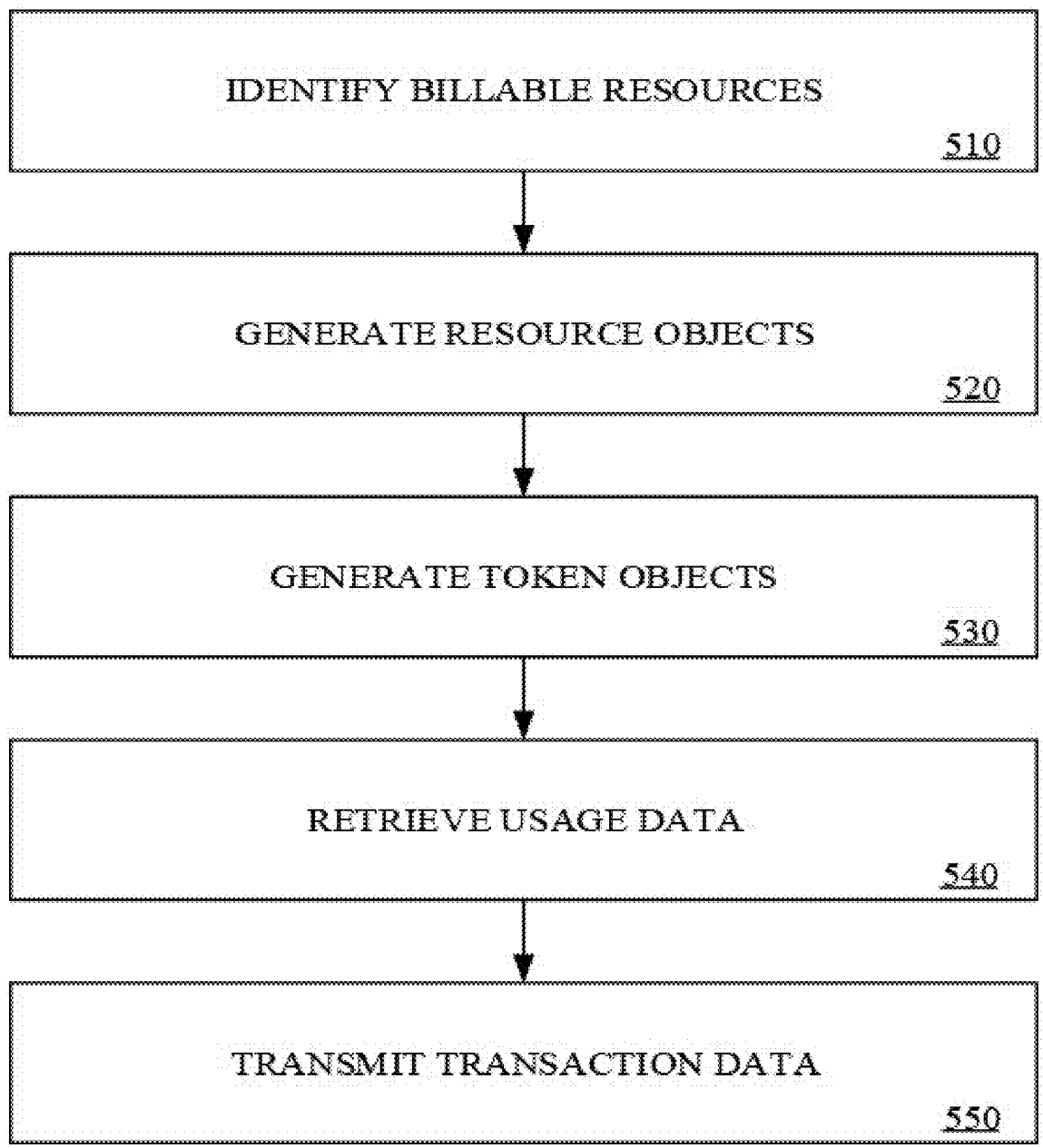
FIG. 5 is a flow diagram illustrating one example embodiment of a process performed by an operator platform.

FIG. 5 is a flow diagram illustrating one embodiment of a process performed by operator platform 110. At processing block 510, resources for which a consumer may be billed (or billable resources) are identified. At processing block 520, a resource object is generated for each identified billable resource. At processing block 530, a token object is generated for each resource. At processing block 540, the measuring agents use resource objects to retrieve usage data from each associated billable resource. At processing block 550, the API client is invoked to transmit transaction data for each of the billable resources as blocks of transaction data in the smart contract. Subsequently, the smart contract is updated via the blocks of transaction data. Once updated, the smart contract is verified and signed by both the consumer and provider, as well as notary service 310. Subsequently, the DLT is updated with pricing and consumption details included in the smart contract.

Figure 6:
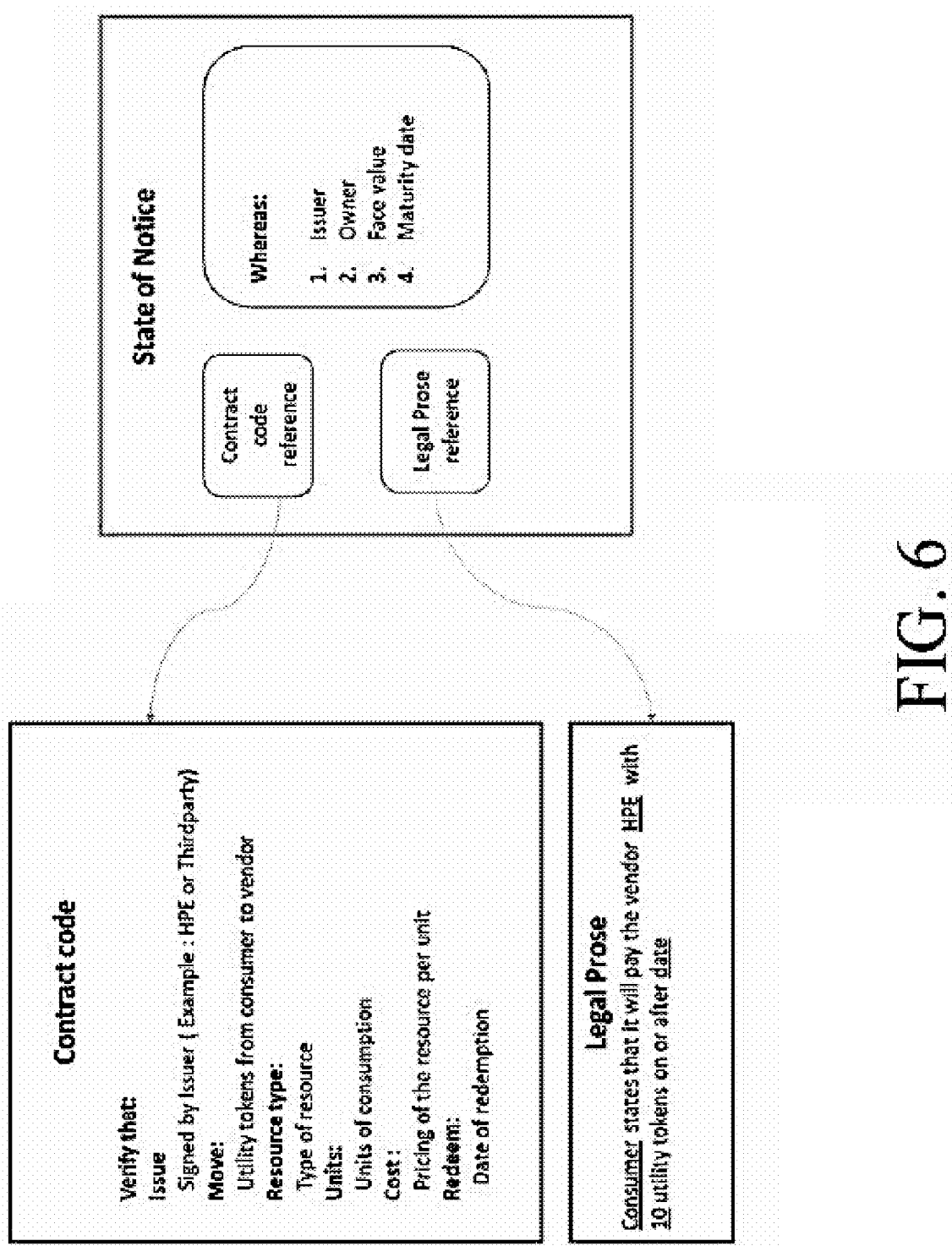
FIG. 6 illustrates one example embodiment of a smart contract.

According to one embodiment, the smart contract includes state objects, in addition to the executable code. In such an embodiment, the executable code validates changes to state objects in transactions. State objects include the data stored in the DLT, which represent the current state of an instance of a contract, and are used as inputs and outputs of transactions. FIG. 6 illustrates one embodiment of a smart contract. As described above, the smart contract includes a units of consumption entry, as well as an entry indicating a pricing per unit of each of the consumed resource. The smart contract also includes notice state object that comprises data and a scheme with properties. As the state changes, these properties changes. In the context of resource consumption, the state of notice will have the schema and properties of the participants, the face value of the contract with the maturity date. Additionally, the State of Notice includes a reference to the actual contract code at which the resource types and cost per unit consumption are defined. The contract code verifies the transaction and executes the contract for resource consumption. In one embodiment, a legal prose state object is provided that represents a template and parameters of contract blueprints and the legal agreement between the parties for real world contract.

The above-described DLT platform enables each instance of a resource to be consumed as a service. Thus, hardware, software and micro service resources may each be provided to consumers in individual units of consumption, and for which the consumers may be billed on a pricing per unit for each consumed resource.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium (e.g., computer readable medium) may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system, comprising:
one or more computing devices hosting an operator platform to facilitate access to the first set of infrastructure resources from infrastructure providers, including one or more processors to generate one or more blocks of transaction data associated with each resource in the first set of infrastructure resources to update chain code, wherein the chain code comprises machine executable code to be executed responsive to a transaction associated with a consumption of a given infrastructure resource of the first set of infrastructure resources by a first infrastructure client computing device, the first infrastructure client computing device is associated with a consumer, the chain code is signed by the consumer, the updating of the chain code comprises including a pricing per unit of the given infrastructure resource and a consumption metric dimension associated with the unit in the chain code, and the chain code is stored in a distributed ledger database shared between the operator platform and the first infrastructure client computing device.

2. The system of claim 1, wherein each block of transaction data of the one or more blocks of transaction data comprises a resource object and a token object.

3. The system of claim 2, wherein the resource object comprises metadata identifying the given infrastructure resource.

4. The system of claim 2, wherein the token object comprises details regarding a cost associated with utilizing the given infrastructure resource.

5. The system of claim 2, wherein the token object comprises details regarding measuring usage of the given infrastructure resource.

6. The system of claim 2, wherein the one or more blocks of transaction data specify units of consumption of the given infrastructure resource.

7. The system of claim 1, wherein the operator platform to facilitate access to a second set of infrastructure resources other than the first set of infrastructure resources.

8. The system of claim 7, wherein the one or more processors to measure usage of each resource in the second set of infrastructure resources and generate second chain code comprising one or more blocks of transaction data for accessing the second set of infrastructure resources, and the second chain code is stored in a second distributed ledger database shared between the operator platform and a second infrastructure client computing device other than the first infrastructure client computing device.

9. The system of claim 8, further comprising a first channel coupled between the first infrastructure client computing device, the operator platform and a given infrastructure provider of the first set of infrastructure providers, and a second channel coupled between the second infrastructure client computing device, the operator platform and the given infrastructure provider.

10. The system of claim 9, wherein the second channel is isolated from the first channel.

11. The system of claim 1, wherein the one or more processors to further:
provide a first block of the one or more blocks to specify the pricing per unit and the consumption metric dimension; and
provide a second block other than the first block of the one or more blocks to specify a pricing per unit of a second infrastructure resource other than the first infrastructure resource of the first set of infrastructure resources.

12. The system of claim 1, wherein the chain code is further signed by an infrastructure provider of the infrastructure providers.

13. The system of claim 1, wherein the consumption metric dimension comprises a time dimension, and the updating of the chain code further comprises including in the chain code at least one of a memory consumption or a processor utilization as an additional consumption metric dimension associated with the unit.

14. The system of claim 1, wherein the given infrastructure resource comprises a microservice, and the consumption metric dimension corresponds to a result produced by the microservice.

15. A method to facilitate access to infrastructure resources, comprising:
generating, by an operator platform, one or more blocks of transaction data associated with each of a plurality of resources provided by an infrastructure provider to an infrastructure client;
measuring, by the operator platform, usage of each of the plurality of resources by the infrastructure client; and
transmitting, by the operator platform, the one or more blocks of transaction data to update chain code, wherein the chain code comprises machine executable code to be executed responsive to a transaction associated with consumption of a given resource of the plurality of resources by an infrastructure client computing device, the infrastructure client computing device is associated with the infrastructure client, the chain code is signed by the infrastructure client, the updating of the chain code comprises including a pricing per unit of the given resource and a consumption metric dimension associated with the unit in the chain code, and the chain code is stored in a distributed ledger database shared between the operator platform and the infrastructure client.

16. The method of claim 15, wherein each block of transaction data of the one or more blocks of transaction data comprises a resource object and a token object.

17. The method of claim 16, wherein the resource object comprises metadata identifying the given resource.

18. The method of claim 16, wherein the token object comprises details regarding a cost associated with utilizing the given resource.

19. The method of claim 16, wherein the token object comprises details regarding measuring usage of the given resource.

20. A non-transitory computer readable medium having instructions, which when executed by a processor, causes the processor to:
generate one or more blocks of transaction data associated with each of a plurality of resources provided by an infrastructure provider to an infrastructure client;
measure usage of each of the plurality of resources by the infrastructure client; and
transmit the one or more blocks of transaction data to update chain code, wherein the chain code comprises machine executable code to be executed responsive to a transaction associated with consumption of a given resource of the plurality of resources by an infrastructure client computing device, the infrastructure client computing device is associated with the infrastructure client, the chain code is signed by the infrastructure client, the updating of the chain code comprises including a pricing per unit of the given resource and a consumption metric dimension associated with the unit in the chain code, and the chain code is stored in a distributed ledger database shared between the operator platform and the infrastructure client.

21. The computer readable medium of claim 20, wherein each block of the one or more blocks of transaction data comprises a resource object and a token object.

22. The computer readable medium of claim 21, wherein the resource object comprises metadata identifying the given resource.

23. The computer readable medium of claim 21, wherein the token object comprises details regarding a cost associated with utilizing the given resource.

24. The computer readable medium of claim 21, wherein the token object comprises details regarding measuring usage of the given resource.

* * * * *